US012697592B2

(12) United States Patent
Hjelmsmark

(10) Patent No.: US 12,697,592 B2
(45) Date of Patent: Aug. 4, 2026

(54) FILTRATION DEVICE

(71) Applicant: Sani Membranes ApS, Farum (DK)

(72) Inventor: Henrik Hjelmsmark, Farum (DK)

(73) Assignee: Sani Membranes ApS, Farum (DK)

( * ) Notice: Subject to any disclaimer, the term of this patent is extended or adjusted under 35 U.S.C. 154(b) by 254 days.

(21) Appl. No.: 18/264,754

(22) PCT Filed: Feb. 8, 2022

(86) PCT No.: PCT/EP2022/052990
§ 371 (c)(1),
(2) Date: Aug. 8, 2023

(87) PCT Pub. No.: WO2022/171615
PCT Pub. Date: Aug. 18, 2022

(65) Prior Publication Data
US 2024/0050901 A1    Feb. 15, 2024

(30) Foreign Application Priority Data

Feb. 11, 2021    (DK) ............................ PA2021 00152

(51) Int. Cl.
B01D 63/16 (2006.01)
B01D 63/06 (2006.01)
B01D 65/08 (2006.01)

(52) U.S. Cl.
CPC ........... B01D 63/16 (2013.01); B01D 63/063 (2013.01); B01D 65/08 (2013.01); *B01D 2315/04* (2013.01); *B01D 2321/2058* (2013.01)

(58) Field of Classification Search
CPC ...... B01D 63/16; B01D 63/063; B01D 65/08; B01D 2315/04; B01D 2321/2058; (Continued)

(56) References Cited

U.S. PATENT DOCUMENTS

2008/0035568 A1    2/2008  Huang
2015/0247114 A1*  9/2015  Gebauer ................ C12M 41/00
                                                                    435/243

(Continued)

FOREIGN PATENT DOCUMENTS

DE      10 2006 040 451 A1    2/2008
DE          102011083954 A1 *  4/2013  ............. B01D 63/16

(Continued)

OTHER PUBLICATIONS

International Search Report and Written Opinion for International Application No. PCT/EP2022/052990 dated Mar. 21, 2022 (14 pages).

*Primary Examiner* — Pranav N Patel
(74) *Attorney, Agent, or Firm* — Nixon Peabody LLP

(57) ABSTRACT

The present invention relates to a filtration device being adapted for continuous vibration and pressure driven filtration. Said filtration device comprises a filter module which comprises at least one tubular semipermeable membrane element, said module further comprises a drain area for permeate, an outlet for permeate, an inlet for feed fluid and an outlet for retentate; said module further comprises one or more flexible volume chambers being filled with gas and in close contact with but separated from the internal module of the filter module through a flexible wall; said filtration device comprises a vibration motor being adapted to provide a vibrating motion to the device.

20 Claims, 3 Drawing Sheets

(58) Field of Classification Search
CPC .. B01D 63/066; B01D 63/067; B01D 63/068;
B01D 63/062
See application file for complete search history.

(56) References Cited

U.S. PATENT DOCUMENTS

| 2017/0065762 A1* | 3/2017 | Larsen | ............... | B01D 61/0022 |
| 2019/0201819 A1* | 7/2019 | Pavlik | .................. | B01D 29/908 |
| 2021/0238063 A1* | 8/2021 | Christou | ................... | C02F 1/52 |

FOREIGN PATENT DOCUMENTS

| EP | 3 579 952 A1 | 2/2008 |
| WO | WO 2018/145714 A1 | 8/2018 |

* cited by examiner

FILTRATION DEVICE

CROSS REFERENCE TO RELATED APPLICATIONS

This application is a U.S. National Stage of International Application No. PCT/EP2022/052990 filed on Feb. 8, 2022, which claims the benefit of Danish Patent Application No. PA 2021 00152, filed on Feb. 11, 2021, each of which is hereby incorporated by reference in its entirety.

FIELD OF THE INVENTION

The present invention relates to a filtration device being adapted for continuous vibration and pressure driven filtration. Said filtration device comprises a filter module which comprises at least one tubular membrane element, and said tubular membrane element comprises a semipermeable membrane, an inlet for feed fluid, an outlet for permeate and an outlet for retentate; said module further comprises two or more flexible volume chambers being filled with gas and in close contact with but separated from the retentate part of the filter module through a flexible wall; said filtration device comprises a vibration motor being adapted to provide a mostly linear vibrating motion to the device along the length of the tubular element. As the gas as in the in the flexible volume chambers can expand and compress the invention allows for the retentate in the retentate part of the module to move relative to the membrane as the filter module is vibrated. The inertia of the retentate will counter the move of the module creating a washing turbulence on the membrane surface by the retentate and this will keep the membrane clean and so secure continuous fouling free filtration using a minimal of energy.

The filtration device of the invention is useful for operations, such as fine filtration, microfiltration and ultrafiltration of liquids using a semipermeable membrane, where the membrane is typically subjected to a tangential flow of feed fluid. The filtration device is useful in operations where a robust and sanitary, fouling preventing continuous filtration is desirable, and the filtration device is capable of being configured to filtering operations of a wide range of fluid volumes, such as volumes as small as about 100 mL and being scalable to filter larger volumes, such as 100 m3.

DESCRIPTION OF THE PRIOR ART

Published international patent application No. WO2018145714A1 discloses a vibrating device adapted for vibration of a filter plate assembly adapted for continuous vibration driven filtration, where said vibration device comprises a vessel housing having a vessel pressure chamber, and where said filter plate assembly, which may comprise additional semipermeable membranes, and which comprises a plurality of filter plates comprising one or more permeate channels and one or more permeate exits extending perpendicular to the filter plate assembly through said vessel housing, and where said filter plate assembly is rigidly mounted inside said vessel pressure chamber, said vibrating device comprising at least one retentate inlet adapted for a retentate stream to enter the vessel housing, and at least one retentate outlet from the vessel housing, said vibrating device further comprising a vibration motor which provides a vibrating motion to the vessel housing, where said vibrating device comprises one or more flexible volume chambers being filled with gas and being adapted to expand and/or compress the volumes of the flexible volume chambers inside the vessel housing to allow the retentate in the module to move in parallel relative to the surface of said filter plates, when said vessel housing is subjected to a vibrating motion. This vibrating device is capable of filtration, such as microfiltration or ultrafiltration, of fluids at reduced energy expenditure. The use of filter plates, however, puts a limit on the down-scaling size obtainable, process parameters such as temperature, materials as well as to the design of chamber to secure functionality of the flexible volume (cushion) chambers.

When membranes, such as semipermeable membranes are used in a cross flow configuration, the media to be filtered is pumped at a speed of 1 to 5 meter per second across the surface of the membrane to keep solids from building up and depositing on the membrane and to keep a boundary layer above the membrane surface as small as possible, hereby keeping the membrane free and functional for a longer time in operation. The same effect is achieved by moving the membrane relative to the media as achieved in present invention.

SUMMARY OF THE INVENTION

It is an object of the present invention to provide a filtration device having a simplified module construction with optimized free flow filtering capacity and being capable of maintaining a high flux in a continuous pressure and vibration driven filtration process while having a wide range of scaling sizes for filtration of very small volumes of fluids as well as large volumes using the same general construction configuration.

This is achieved by the filtration device of the invention comprising a filter module (2) comprising a number of tubular membrane elements (16) fixed in a permeate collection chamber (10) at inlet end (6) and outlet end 7 of the tubular element, said tubular membrane elements typically having a semipermeable membrane (11) that can allow permeate to pass through the membrane tube to the permeate collection chamber (10), the inside of said tubes in one end in fluid contact with an inlet chamber (5a) for media to be filtered and in the other end in fluid contact with an outlet chamber (5b) for filtered media or retentate, said inlet chamber and outlet chamber each being in fluid contact with a flexible volume chamber (8A, 8B) filled with gas and the flexible volume chambers having a flexible chamber wall (14), and being adapted to expand and/or compress their volumes thus allowing the feed fluid or retentate in the module to move in parallel (back and forth) relative to the surface of the semipermeable membrane when said filter module is subjected to a vibrating motion, said movement of retentate relative to the tube surface caused by the inertia of the media and made possible through the flexible volume chambers in either end of the movement.

The invention provides a freely movable filtration device (1) comprising a filter module (2), being adapted for continuous vibration and pressure driven filtration of fluids, where said filter module (2) comprises at least in one end a feed inlet (6) and in the opposite end a retentate outlet (7), and further comprises at least two flexible volume chambers (8A, 8B) being filled with gas and being spaced apart such as being positioned (distally) in each end of the module and proximal to the feed inlet (6) and the retentate outlet (7), respectively, and where the permeate collection chamber (10) comprises a permeate outlet (9); said filter module (2) further comprising a semipermeable tubular membrane element (16) having the semipermeable membrane (11) sealingly fixed in either end (3, 4); and said filtration device (1)

further comprising means for providing vibrating motion eg. a vibration motor (12) having a receptacle (13) for mounting said filter module (2), said vibration motor (12) being adapted to provide a vibrating motion to the filter module (2), characterized in that said tubular membrane element is in fluid contact in either end to a flexible volume chamber (8A, 8B) with flexible chamber wall (14) adapted to expand and/or compress their gas volumes thus allowing the retentate or fluid to be filtered in the tubes to move in parallel (back and forth) relative to the surface of said semipermeable membrane (11), when said filtration module (2) is subjected to a vibrating motion.

Hereby a simple construction is obtained using a limited number of components allowing the same construction configuration for a wide range of device sizes corresponding to feeds of very small volumes as well as much larger volume. A considerable advantage is that filtration data obtained for small test volumes using the filtration device of the invention can easily be extrapolated to much larger industrial type volumes using an up-scaled version of the filtration device.

Using the device of the invention the liquid media to be filtered is vibrated relative to the surface of the semipermeable membrane and as pressure in the inlet and outlet chambers (5a, 5b) is kept higher than the pressure in the drain areas (10) permeate is passed into the drain area so that free flow filtration is obtained. The medium to be filtered can be highly viscous and may contain larger particulate impurities, as long as the medium do not block the free flow passage through the device.

An optimized cleaning functionality of the membrane surface is achieved using the vibrating filtration device of the invention by applying movement of the medium relative to the filter module and thus the membrane surface through which the media is to be filtered, and this relative movement is achieved when the filter module is vibrated and the fluid medium has room not to move with the tubes due to the inertia of the medium due to the flexible volume chambers. The vibration can hereby keep the membrane surface free and clean, maintaining high flux through the membrane in a continuous filtration process. The media to be filtered, the retentate, can be concentrated in the device so a feed stream of media is required as permeate is drained or media can continuously pass from inlet to outlet in a slow cross flow while being concentrated.

In an embodiment, the vibrating movement of the filter module is achieved through oscillating air feed to the air volume cushions, whereby the air cushions also work as vibrating motor as the inertia of the media moves the filter module 2 as if the motion was driven by an external drive (12). If a uniform retentate is wanted throughout the module, this can be achieved by circulating concentrate from the exit (7) back to the vessel entry (6) side while adding unconcentrated media to the circulation, or the media can circulate over a tank while being concentrated as permeate is drained from the circulation through the membrane and drain area.

In an embodiment each of the two flexible volume chambers (8A, 8B) comprise a flexible gasket (14) being adapted to separate the gas volume of the flexible volume chambers (8A, 8B) from the module inlet and outlet chambers (5a, 5b), and the remaining walls (15) of the flexible volume chambers being rigid. An alternative flexible volume chamber can be formed as a fully flexible balloon type cushion chamber or a tubular formed cushion chamber sealed off from the inlet and outlet areas such as shown in FIG. 2.

In an embodiment the semi permeable membrane is on the outside of the tubular membrane elements and the outside chamber (5c) further comprises one or more flexible volume chambers (8A, 8B) comprising flexible gas enclosures positioned distally in chamber (5c) of the filter elements and further comprises an inlet and outlet for retentate said inlet and outlet placed distally and the inside of the tubes in fluid connection at least in one end to a collection chamber (10) for permeate.

In an embodiment said vibration motor (12) is adapted to provide vibrating motion of a linear nature. The vibration motor can as example be electrical with a rotating unbalance weight or pneumatic with back and forth moving counterweight creating an active or reactive movement of the filtration module (2) when the module is flexibly supported allowing for said movement.

In an embodiment said vibration motor (12) provides vibration to said filter module (2) through an eccentric axis (19) whereby the filtration module is directly actuated by the drive motor. This design will provide a very simple mechanical solution of the device.

In an embodiment the filtration device of the invention comprises two or more filter modules (2) being connected through an eccentric axis (19) and structurally adapted to balance out vibrations and to avoid external vibration.

In an embodiment, the filter feed pressure and air cushion pressure of the flexible volume chamber is adjusted to be the same, maximizing the efficiency of the air cushions. In all designs caution must be taken to avoid a higher feed pressure than allowed in vessel design. Also the air cushions must be sized or pressurized to secure that they operate optimally as air springs for the inertia induced moving liquid in the module.

In an embodiment, the device is cleaned by substituting feed with rinse water or cleaning media and increasing flow over the membrane by circulating the media from inlet to outlet while maintaining the rinsing function through vibration.

In an embodiment, the feed is provided by a tank with air or (inert) gas under pressure, and the pressurized gas act as feed pump, pressing the feed into the filtration device. This feed system can provide a stable feed at very low cost and using only simple off the shelf elements. The pressurized gas can be connected to the air cushions 8A, 8B optimizing the function of the gas cushions. In an embodiment, the feed is provided by a tank wherein a sterile bag contains the feed media, with air or gas under pressure, and the pressurized gas act as feed pump, pressing the feed into the filtration device. This feed system can provide a stable, sterile feed at very low cost and using only simple off the shelf elements.

In an embodiment, the vibrating module is formed in see-through materials or with see-through inspection glasses whereby the semipermeable membrane, the drain area and media can be visually inspected during filtration process and cleaning.

Materials used for the filtration device can be selected from polymeric or co-polymeric thermoplastics or ceramic or metals or combinations of materials or any other suitable material that can withstand the media to be filtered, the applied pressure, such as up to about 5 bar or higher, the temperature span needed, such as from about 5° C. to about 130° C. as well as the medias used for cleaning the filter module. All parts of the device may be produced as one or more parts by 3D printing.

The choice of material must foresee thermal expansion and rigidity of the module and be sustainable to pressure and vibration. Preferred execution is a vessel in stainless steel, polycarbonate or polypropylene, and the semipermeable membrane is preferably a semipermeable ceramic, metallic or polymeric membrane rod with channel opening typically 2 to 25 mm. All materials are readily accessible in food grade versions on the market.

Definitions

The term "permeate" is used for the media that has passed through the filter.

The term "retentate" or "feed" or "media" or "medium" is used herein interchangeably for the media stream to be filtered said media stream is typically a liquid but can be in form of a gas with a mass sufficient to have an inertia resisting vibrational move.

The term "concentrate" and "retentate" as used herein shall interchangeably mean feed that has been concentrated through the filtration process.

The term "filter", "membrane" and "semipermeable membrane" are used interchangeably.

The term "flexible volume chambers", "air cushion" and "gas cushion" are all used interchangeably.

The term "flexible gasket membrane" is impermeable.

The term "tubular membrane element" relates to a longer, rigid, tube or rod shaped element with one or more inside channels, said channels typically 10 to 1000 times longer than its cross measure or diameter, said elements typically of semipermeable material such as sintered ceramic, metal or plastic, typically with inner surface of channels or outer surface of tubes with a defined membrane pore size capable of holding back such as molecules, cells or solids while letting through such as water or thinner medias with smaller molecules. In the present invention the tubular membrane element must be of a rigid material, capable of sustaining vibration.

The term "fine filtration" applies to filtration through slits or holes in the filter-plates of 5 to 50 microns, whereas the term "microfiltration" usually applies to particle sizes between a few hundredths of micrometers and tens of micrometers and is carried out at low differential pressure from just above zero to a few bars. Microfiltration is for example used for sterile filtration of milk. The term "ultra-filtration" is for example used for separating large organic molecules from mineral molecules or small organic molecules and in the ultrafiltration process a higher differential pressure of 1-15 bars may be needed.

DETAILED DESCRIPTION OF THE INVENTION

An embodiment of the invention relates to the vibrating device (1) wherein the filter module (2) comprises two or more flexible gaskets (14), said flexible gaskets being adapted to separate the volume of the vessel inlet and outlet chamber (5a, 5b) and the volume of the flexible volume chambers (8A, 8B). Advantages of using flexible gaskets are that the cushion effect can be achieved in a hygienic design.

An embodiment of the invention relates to the vibrating device (1) wherein the one or more flexible volume chambers (8A, 8B) are formed as gas filled balloons positioned in the module or in a cavity as example as the areas indicated by (8A, 8B). Advantages of using the gas filled balloons are that these can be easily sealed to form a gas cushion and pressure can act on the cushion from all sides.

An embodiment of the invention relates to the vibrating device (1) as described above, wherein the module (2) comprises one or more connections adapted to control the pressure in the flexible volume chambers (8A, 8B) so that the pressure is balanced with the retentate or media to be filtered in the vessel. Advantages are that when the volume of the flexible volume chamber is large the spring effect of the cushion is increased thus allowing the media to move easily relative to the planar membrane.

A further embodiment of the invention relates to the vibrating device (1) as described above, wherein the vibrating device (1) comprises two or more filter modules (2), said two or more filter modules (2) are connected and can be structurally adapted to balance out vibrations and to avoid external vibration.

A further embodiment of the invention relates to the vibrating device (1) as described above, wherein the filter module (2) comprises back mix connection (as (6) and (7)), said back mix connections being adapted such that the retentate to be filtered can be homogenized through circulation through one or more back mix connections for moving retentate from one area of the outlet/retentate chamber (5b, 5c) to another area of the inlet/retentate chambers (5a, 5c).

A further embodiment of the invention relates to the vibrating device (1) as described above, wherein the vibrating device (1) comprises at least one flexible support, where the device (1) is supported by said at least one flexible support allowing vibrating movement of the device (1), where said at least one flexible suspension can be guiding the vibration movement. The advantage of a flexible suspension is that the vibration can executed without external reactions or vibrations of the supporting foundation.

A further embodiment of the invention relates to the vibrating device (1) as described above, wherein said vibration motor (12) is adapted to provide vibrating motion of a linear nature allowing for simple suspension and or simple vibration drive motor for the movement.

A further embodiment of the invention relates to the vibrating device (1) as described above, wherein the flexible volume chambers (8A, 8B) in the filter module (2) are connected to a gas pressurized feed tank adapted for media or retentate to be filtered, said gas pressure pushing the feed to the module inlet chamber (5a) said gas pressure balancing retentate pressure in the flexible volume chambers (8A, 8B) and in the module (2). An advantage of this embodiment is the provision of a simple means of equalizing gas pressure in the flexible volume chambers to the fluid pressure in the module. In an embodiment, the filter module (2) comprises actuation means (12) for mechanical actuation of the tubular membrane elements in a path in line with the length of the membrane element (16). The flexible volume chambers can be formed as individual balloons in the retentate inlet and outlet chambers (5a, 5b), however, for improved hygiene and as shown in FIG. 1 the gas filled flexible volume chambers (8A, 8B) are in certain embodiments formed as sealed off parts of the module, where a flexible gasket (14) separates the cushion gas volume (8A, 8B) from the retentate volume. The cushion chambers are optimally placed on opposite ends of the semipermeable membrane (11) and in the direction of motion when the module is vibrated, to allow for optimal movement of retentate in relation to the surface of membrane tubes in the filter module.

In an embodiment, the filter module assembly (2) comprises a plurality of tubular filter-membranes (11) where the tubular channels are formed as round or square any other form having effective membrane surface.

The filter device, such as is illustrated in FIG. 1, comprises a plurality of tubular membrane elements. The filter module (2) is vibrated in the same direction as the tubes with a vibration motor with amplitude of typically 2-25 mm at frequency between 5 and 50 Hz. The module includes two or more air cushions formed as flexible volume chambers or balloons positioned in each end of the vibrating direction and on each end of the filter tube assembly, allowing the media to be filtered to move relatively to the filter surfaces as the filter module is moved with the vibrating motor (12) and the air cushions are squeezed or expanded to allow for the relative movement of the retentate, part of said retentate moving in and out respectively in the membrane channels and so back and forth throughout the membrane channel.

The vibrating motor is typically a motor driven eccentric weight or an eccentric piston connection or pneumatic piston, but other means are also available.

The device should to be of a robust design that can sustain the vibration as well as the required internal pressure, as the internal pressure corresponds to the trans membrane pressure, given that permeate can flow unrestricted from the permeate exit(s).

The device is typically mounted on or hanging from springs or elastic mounts allowing for the vibrating movement. The module design is typically adjusted to tightly enclose the tubular filter membrane assembly to avoid larger dead volumes in the vessel.

The vibrating filter device (1) can be used for vibration driven dead-end filtration operation, where the media is concentrated in the module (2) and discharged at the end of operations or intermittently.

The vibrating filter device (1) can be used for continuous or intermittently vibration driven filtration operation, where one phase of the media is concentrated in the module (2) and the vibration action keeps the flux of the filter area from leveling off.

The vibrating filter device (1) can be used for continuous separating gas or liquids entering the device through inlet (6) said liquid with high solids content (such as up to up to 1% wt, such as up to 5% wt, such as up to 10% wt, such as up to 15% wt, such as up to 20% wt, such as up to 25% wt, such as up to 30% wt, such as up to 40% wt, such as up to 50% wt), or with high viscosity (such as up to up to 10 cP, such as up to 50 cP, such as up to 100 cP, such as up to 500 cP, such as up to 1000 cP, such as up to 2000 cP, such as up to 5000 cP, such as up to 10000 cP, such as more than 10000 cP), or with high sanitary demand (such as cell count up to $10^1$ cfu/mL, such as up to $10^2$ cfu/mL, such as up to $10^3$ cfu/mL, such as up to $10^4$ cfu/mL, such as up to $10^5$ cfu/mL, such as up to $10^6$ cfu/mL, such as up to $10^7$ cfu/mL, such as up to $10^8$ cfu/mL, such as more than $10^8$ cfu/mL), or for concentrating or separating such as polypeptides, enzymes, proteins, yeast, or cells in a liquid and/or a combination thereof in a permeate phase exiting the device through exit (9) and a retentate phase exiting the device through exit (7).

Figure 1:
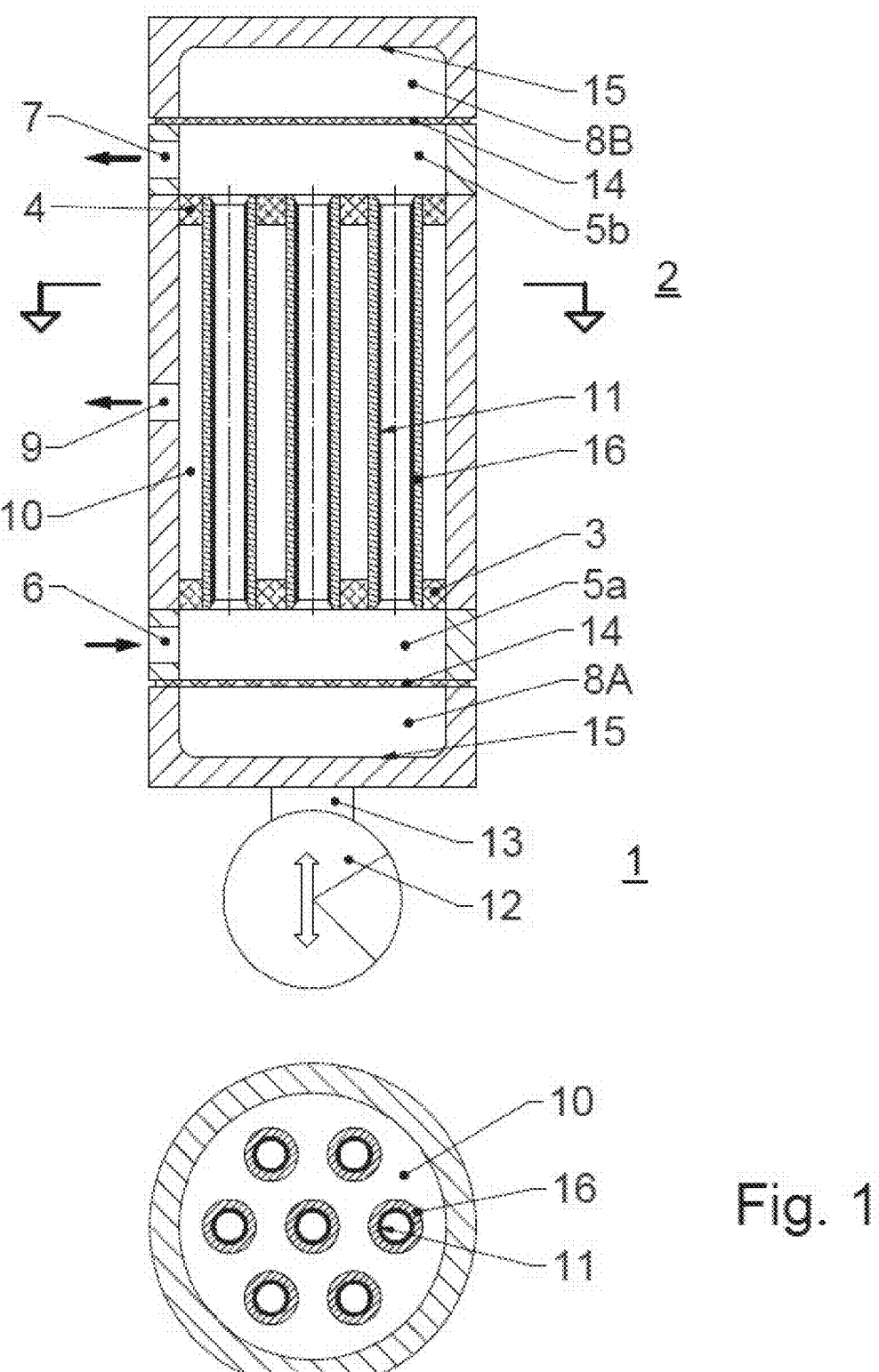
FIG. 1 is a cross-sectional view of an embodiment of the filtration device having one filter module with a number of tubular filter elements.

In the illustrated embodiment, the media or retentate entry (6) and retentate exit connection (7) as well as gas cushion chamber (8A) and (8B) are placed in either end of the long typically round module (2). The tubular membrane elements (16) are positioned in permeate collection chamber (10). Said tubular elements are fixed in either end (3, 4) in a sealing and fixing potting sealing of permeate drain area from inlet and outlet chambers (5a, 5b). The cushion chambers (8A, 8B) are sealed off from the inlet and outlet chambers (5a, 5b) by a very flexible gasket membrane (14) that is edge wise sealed. The membrane (11) is formed on the inside wall of the tubular membrane elements (16). The filter module is connected to the driving motor (12) through the connection part (13) and the device can vibrate back and forth or up and down when suspended in suitable springs. Connection hoses or tubes for media, permeate and retentate (6, 7 and 9) must be very flexible to allow for the vibrational movement of the device.

FIG. 1 further show a cut through of the filter module where 7 tubular filter elements (16) are seen in the permeate collection chamber (10).

Figure 2:
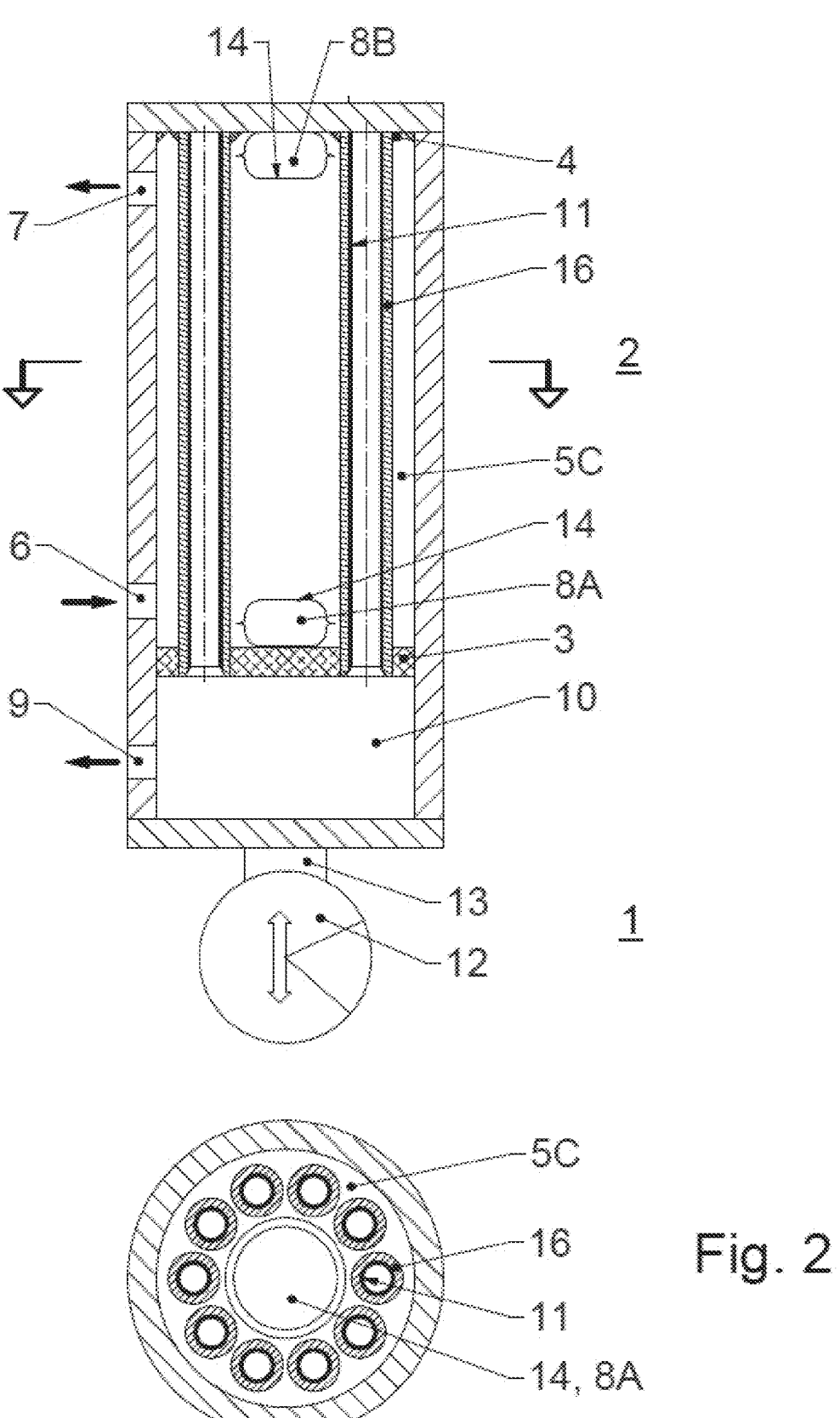

FIG. 2 is a cross-sectional view of an embodiment of the filtration device having one filter module with a number of tubular filter elements.

In the illustrated embodiment, the media or retentate entry (6) and retentate exit connection (7) as well as gas cushion chamber (8A) and (8B) are placed in either end of the long round module (2). The tubular membrane elements (16) are positioned in the retentate channel (5c) said tubular elements are fixed in either end (3, 4) in a sealing and fixing potting sealing of permeate drain area (10) from retentate channel (5c). The flexible cushions (8A, 8B) are sealed off from the retentate channel (c) by a very flexible gastight balloon type membrane (14). The semipermeable membrane (11) is formed on the outside wall of the tubular membrane elements (16). The filter module is connected to the driving motor (12) through the connection part (13) and the device can vibrate back and forth or up and down when suspended in suitable springs. Connections for media, permeate and retentate must be very flexible to allow for the vibrational movement of the device.

FIG. 2 further show a cut through of the filter module where the tubular filter elements (16) are seen in the retentate flow channel (5c).

Figure 3:
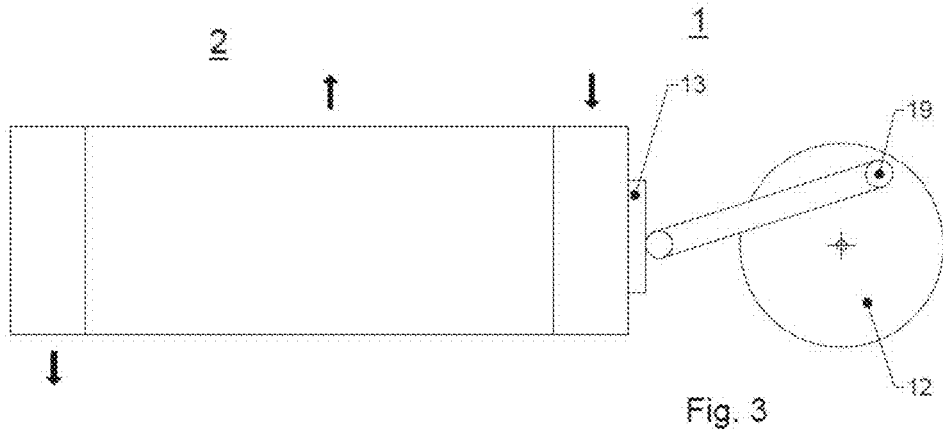

FIG. 3 illustrates one embodiment of a vibrating filtration device (1) with filter module (2) connected through a respectable (13) and a piston arm to a vibration drive motor (12) with eccentric axle (19).

Figure 4:
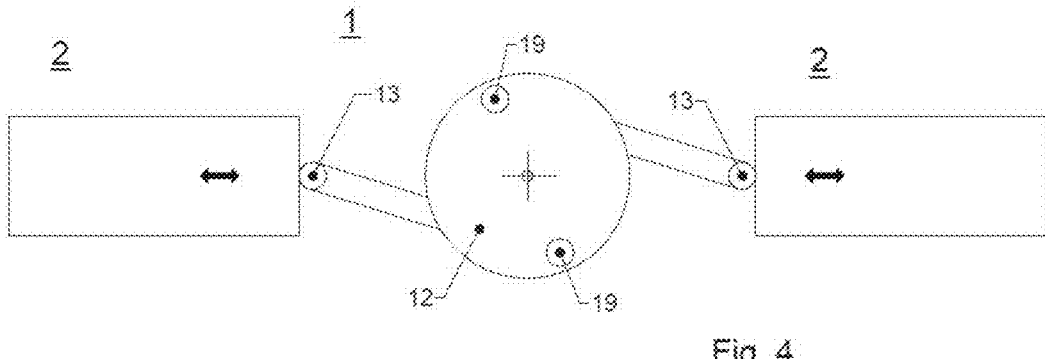

FIG. 4 illustrates one embodiment of a vibrating filtration device (1) with 2 filter modules (2) connected through receptacles (13) and piston arms to a vibration drive motor (12) with eccentric axles (19). As the two filter modules moves in opposite directions, external vibrations can be eliminated.

Figure 5:
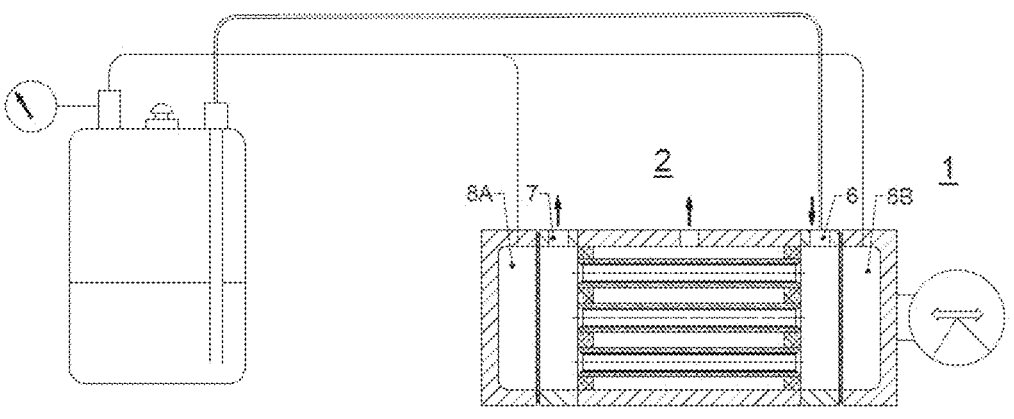

FIG. 5 illustrates one embodiment of a vibrating filtration device (1) with one filter module (2) connected to a feed tank, where feed is pumped from the feed tank (by gas being pumped into the feed tank, and the pressured gas forces the feed into the module inlet chamber (5a) via the feed or retentate entry (6). The same gas that pumps the feed is connected to the cushion chambers (8A, 8B) whereby the pressure is the same in the retentate area and the cushion chambers, allowing for an improved movement of the retentate in relation to the chamber during the vibration movement of the filter module (2) as the air cushions (8A, 8B) are squeezed or expanded.

In a not shown embodiment, the feed is pumped into the device by a suitable feed pump and gas in the flexible volume chambers (8A, 8B) can be adjusted by other means. In a not shown embodiment, a feed mixing pump is connected to the retentate exit (7) and to a feed or retentate back mix inlet connection (6), and this mixing pump can be used during operation to homogenize the retentate, or to ensure mixing during cleaning of the device.

It goes without saying that different modifications may be made to the examples described, without departing from the scope and spirit of the invention.

The design shown allows for production of very small filter units for continuous filtration with very little dead volume inside as is a requested feature in drug development. It shall however be noted that the overall design hereby provides up-scaling possibilities to have many square meters of filtration area in one compact filtration unit.

All parts can be of food and pharmaceutical grade material with traceable origins, making the filtration unit suitable for human food consumables and the likes. The materials used can be of a plastic material that can be reused by re-melting or burned as a clean fossil-like fuel. The semipermeable membrane element can be of ceramic or metal or plastic or the like and is typically a sintered material with or without surface treatment. The parts of the unit can be produced by 3-D printing or sintering or by other means.

WORKING EXAMPLES

A new 350 cm² filter assembly with a 0.2 micron polypropylene tubular membrane was mounted in the filter module and the filter module was mounted in the vibration drive unit. The Vibro unit was checked for leaks with water at 1 bar.

A 30 min lye wash pH 11 with 1,25% Divos 120 CL at 50° C. was performed at 0.5 bar pressure and the vibration motor at 15 Hz with partly opened retentate outlets. The unit was drained and flushed thoroughly with water. The unit was drained, and water was used as the media in a dead-end filtration at 0,1 bar with the vibration motor at 15 Hz and closed retentate outlets. The average flux was measured after 10 min to 420 LMH over a 5 min period.

The unit was drained, and orange juice was used as the media in a dead-end filtration at 0,5 bar with the vibration motor at 15 Hz and closed retentate outlet. The time was registered at each 50 ml of permeate produced and the average flux between the measuring points was calculated. The results are listed in Table 1.

TABLE 1

| Time (sec) | Permeate Volumen (ml) | Permeate Flux (LMH) |
|---|---|---|
| 0 | 0 | — |
| 40 | 50 | 183 |
| 80 | 100 | 147 |
| 140 | 150 | 142 |
| 200 | 200 | 127 |
| 270 | 250 | 117 |
| 340 | 300 | 111 |
| 420 | 350 | 98 |
| 500 | 400 | 83 |
| 600 | 450 | 82 |
| 700 | 500 | 80 |
| 800 | 550 | 79 |
| 900 | 600 | 77 |
| 1000 | 650 | 69 |
| 1100 | 700 | 61 |
| 1210 | 750 | 61 |
| 1320 | 800 | 60 |

The unit was drained, and water was used to flush out the media in a continuous filtration at 0.5 bar with the vibration motor at 15 Hz and partly opened retentate outlet for 15 min.

A 30 min lye wash pH 11 at 50° C. was performed at 0.5 bar pressure and the vibration motor at 15 Hz, with partly opened retentate outlets. The unit was drained and flushed thoroughly with water.

The unit was drained, and water was used as the media in a dead-end filtration at 0.1 bar with the vibration motor at 15 Hz and closed retentate outlets. The average flux was measured after 10 min to 410 LMH over a 1 min period.

The unit was drained, and orange juice was used as the media in a dead-end filtration at 0,5 bar with the vibration motor stopped and closed retentate outlet. The time was registered at each 50 ml of permeate produced and the average flux between the measuring points was calculated. The results are listed in Table 2.

TABLE 2

| Time (sec) | Permeate Volumen (ml) | Permeate Flux (LMH) |
|---|---|---|
| 0 | 0 | — |
| 40 | 50 | 158 |
| 160 | 100 | 53 |
| 240 | 150 | 79 |
| 370 | 200 | 48 |
| 500 | 250 | 48 |
| 660 | 300 | 39 |
| 840 | 350 | 35 |
| 1020 | 400 | 35 |
| 1220 | 450 | 32 |
| 1430 | 550 | 30 |
| 1650 | 600 | 29 |
| 1900 | 650 | 25 |

The unit was drained, and water was used as the media to flush out the unit at 0.5 bar with the vibration motor at 15 Hz and partly opened retentate outlet for 15 min.

A 30 min lye wash pH 11 at 50° C. was performed at 0.5 bar pressure and the vibration motor at 15 Hz with partly opened retentate outlets. The unit was drained and flushed thoroughly with water.

The unit was drained, and the average water flux was measured after 10 min to 380 LMH over a 1 min period.

Conclusion: A 15 Hz vibration made the orange juice filtration faster and unit was seen to be performing as larger unit using same membrane.

The invention claimed is:

1. A filtration device, comprising:
a filter module adapted for filtration of media, the filter module comprising one or more tubular membrane elements, the filter module comprising two gas-filled flexible volume chambers positioned at ends of the filter module, each of the two gas-filled flexible volume chambers providing a cushioning effect on the media in response to external vibration applied to the filter module, the filter module comprising at least one inlet for media to be filtered and at least one retentate outlet for retentate, the at least one inlet and the at least one retentate outlet being positioned at the ends of the filter module, the filter module comprising at least one semipermeable tubular membrane forming a path between the inlet and the retentate outlet, the at least one semipermeable tubular membrane being associated with one of the tubular membrane elements and forming a semipermeable wall separating the retentate from a drain area, the drain area comprising a permeate outlet.

2. The filtration device according to claim 1, wherein each of the gas-filled flexible volume chambers comprises (i) a flexible gasket adapted to separate a gas volume of the flexible volume chambers from a remainder of the filter module, and (ii) rigid walls coupled to the flexible gasket.

3. The filtration device according to claim 1, wherein the semipermeable tubular membrane is formed on an inside or an outside of the tubular membrane element.

4. The filtration device according to claim 1, wherein the tubular membrane element has a round or square cross section.

5. The filtration device according to claim 1, wherein the semipermeable tubular membrane is formed on an inside of one or more tubular cavities in the tubular membrane elements.

6. The filtration device according to claim 1, wherein the flexible volume chambers can be connected to a gas pressure source for increasing or decreasing volume of the flexible volume chambers.

7. The filtration device according to claim 1, wherein the two gas-filled flexible volume chambers are positioned at opposing ends of the filter module.

8. The filtration device according to claim 7, wherein the at least one inlet and the at least one retentate outlet are located within the filter module between the two gas-filled flexible volume chambers.

9. The filtration device according to claim 8, wherein a first one of the two flexible volume chambers is adjacent to the at least one inlet and a second one of the two gas-filled flexible volume chambers is adjacent to the at least one retentate outlet.

10. The filtration device according to claim 8, further including an inlet chamber that leads to the at least one inlet and an outlet chamber that leads to the at least one retentate outlet, wherein a first one of the two gas-filled flexible volume chambers is directly adjacent to the inlet chamber and a second one of the two gas-filled flexible volume chambers is directly adjacent to the outlet chamber.

11. The filtration device according to claim 10, wherein the first one of the two gas-filled flexible volume chambers is separated from the inlet chamber by a first flexible membrane that forms part of the first one of the two gas-filled flexible volume chambers, and wherein the second one of the two gas-filled flexible volume chambers is separated from the outlet chamber by a second flexible membrane that forms part of the second one of the two gas-filled flexible volume chambers.

12. The filtration device according to claim 1, further comprising at least one additional filter module, the filter modules being connected to one or more vibration motors.

13. The filtration device according to claim 1, further comprising a vibration motor, the vibration motor being connected to the filter module and configured to vibrate the filter module, wherein during operation of the vibration motor, one part of the media is concentrated in the filter module and discharged from the retentate outlet at the end of the operation or intermittently.

14. The filtration device according to claim 13, wherein the vibration action assists in cleaning the semipermeable membrane filter during operation.

15. The filtration device according to claim 13, wherein the filter device continuously separates media entering the device through at least one inlet, the media having a high solids content, a high viscosity, or requiring a high sanitary demand.

16. The filtration device according to claim 13, wherein the filter device is for concentrating or separating entities in solution such as polypeptides, enzymes, proteins, yeast, or cells in a liquid and/or a combination thereof in a permeate phase exiting the device through the permeate outlet and a retentate phase exiting the device through the at least one retentate outlet.

17. A filtration device, comprising:

a filter module adapted for pressure and vibration-driven filtration of media, the filter module comprises one or more tubular membrane elements, two or more gas-filled flexible volume chambers each positioned at one end of the filter module, at least one inlet for media to be filtered, and at least one retentate outlet for retentate, the inlet and retentate outlet being positioned at distal ends of the filter module and proximal to the flexible volume chambers, the filter module further including at least one semipermeable tubular membrane associated with one of tubular membrane elements that forms a path between the inlet and retentate outlet, the one semipermeable tubular membrane forming a semipermeable wall separating the retentate from a drain area, the drain area comprising a permeate outlet;

a vibration motor having a receptacle for mounting the filter module, the vibration motor being adapted to provide a vibrating motion to the filter module, the flexible volume chambers having at least one flexible chamber wall in contact with the retentate flow and being adapted to expand and/or compress their volumes to allow the retentate to undergo a back-and-forth movement relative to a surface the semipermeable membrane in response to the vibrating motion.

18. The filtration device according to claim 17, wherein the vibration motor is adapted to provide vibrating motion of a linear nature.

19. The filtration device according to claim 17, where the vibration motor provides vibration motion to the filter module through an eccentric axis.

20. A filtration device, comprising:

a filter module being adapted for continuous pressure and vibration driven filtration of media, the filter module comprising a retentate channel, two or more flexible volume chambers each positioned at an end of the retentate channel, at least one inlet for media to be filtered, and at least one retentate outlet for retentate, the at least one inlet and the at least one retentate outlet being positioned at distal ends of the filter module and proximal to the flexible volume chambers, the filter module further including at least one semipermeable tubular membrane located between the at least one inlet and the at least one retentate outlet and forming a semipermeable wall separating the retentate from a drain area, the drain area comprising a permeate outlet; and a vibration motor having a receptacle for mounting the filter module, the vibration motor being adapted to provide a vibrating motion to the filter module, the flexible volume chambers having at least one flexible chamber wall in contact with the retentate flow and being adapted to expand and/or compress their volumes to allow the retentate to undergo a back-and-forth movement relative to a surface the semipermeable membrane in response to the vibrating motion.

* * * * *